(12) United States Patent
Spratt

(10) Patent No.: US 9,875,289 B2
(45) Date of Patent: Jan. 23, 2018

(54) REMOTE KNOWLEDGE SERVER APPARATUS AND METHOD THEREOF

(71) Applicant: Highfleet, Inc., Bankruptcy Estate, Reisterstown, MD (US)

(72) Inventor: Lindsey Spratt, Vienna, VA (US)

(73) Assignee: Highfleet, Inc., Baltimore, MD (US)

( * ) Notice: Subject to any disclaimer, the term of this patent is extended or adjusted under 35 U.S.C. 154(b) by 401 days.

(21) Appl. No.: 14/331,298

(22) Filed: Jul. 15, 2014

(65) Prior Publication Data

US 2014/0324820 A1     Oct. 30, 2014

Related U.S. Application Data

(63) Continuation-in-part of application No. 14/200,013, filed on Mar. 6, 2014, now abandoned.

(60) Provisional application No. 61/774,465, filed on Mar. 7, 2013.

(51) Int. Cl.
*G06F 17/30* (2006.01)
(52) U.S. Cl.
CPC .............................. *G06F 17/30566* (2013.01)

(58) Field of Classification Search
CPC .................................................. G06F 17/30566
See application file for complete search history.

(56) References Cited

U.S. PATENT DOCUMENTS

| | | | |
|---|---|---|---|
| 6,487,545 B1 * | 11/2002 | Wical | G06F 17/271 706/45 |
| 2004/0010488 A1 * | 1/2004 | Chaudhuri | G06F 17/30463 |
| 2010/0174754 A1 * | 7/2010 | B'Far | G06F 17/30507 707/794 |

* cited by examiner

*Primary Examiner* — Grace Park
(74) *Attorney, Agent, or Firm* — Kristin Mazany Nevins; Offit Kurman

(57) ABSTRACT

An apparatus and method for processing an ontological query for data from any of a plurality of different databases on a network coupled to a computer that includes loading a ontological data model comprising a plurality of logical models based on data from the plurality of different databases, compiling the ontological query and optimizing 48 the compiled ontological query according to join and combination rules based on the logical models and describing meta-properties of the data and meta-relationships based on the meta-properties between the data from the plurality of different databases, and processing logical operations on the compiled ontological query.

16 Claims, 13 Drawing Sheets

REMOTE KNOWLEDGE SERVER APPARATUS AND METHOD THEREOF

CROSS REFERENCE TO RELATED APPLICATION

This application is a continuation-in-part of U.S. patent application Ser. No. 14/200,013, filed on Mar. 6, 2014, the complete disclosure of which, in its entirety, is herein incorporated by reference, which claims the benefit of U.S. Provisional Application Ser. No. 61/774,465, filed on Mar. 7, 2013, the complete disclosure of which, in its entirety, is herein incorporated by reference.

BACKGROUND

Technical Field

The present invention generally relates to database systems and querying distributed database systems on a network, and, more particularly, to a process for creating and maintaining ontologies that interface with such systems.

Description of the Related Art

Database engineering practices and technologies of the last two decades have proven a poor match for the complex information handling and integration needs of modern enterprises. For instance, systems involving any sort of analytic component typically require extremely complex and fluctuating rules reflecting real-world situations. Using current techniques, the process of keeping such information systems current is error-prone and prohibitively expensive. Moreover, current systems have a fundamental and more severe problem: integrating data from two or more systems requires custom-made middleware, because it is impossible for the system to "understand" the content of the participating databases well enough to perform the required integration automatically.

In other words, the heterogeneous nature of these sources poses unique challenges having to do with access, accuracy, semantic understanding, completeness, and correlation of performance and maintenance information with relevant resources. The state of current technology is such that the physical constraints having to do with access are easing, but consistent answers to the questions involving content understanding and integration have not yet been found. Therefore, there remains a need in the art to address the problems associated with ontological integration in a highly distributed environment.

SUMMARY

In view of the foregoing, an embodiment herein provides a method for processing an ontological query for data from any of a plurality of different databases on a network coupled to a computer, comprising: loading a ontological data model that comprises a plurality of logical models based on data from the plurality of different databases; compiling the ontological query and optimize the compiled ontological query according to join and combination rules based on the logical models and describing meta-properties of the data and meta-relationships based on the meta-properties between the data from the plurality of different databases; and processing logical operations on the compiled ontological query. According to such a method, the logical operations may include existential qualifications, aggregations and negation. Furthermore, the ontological model substantially may describe each of the plurality of different databases. Additionally, the ontological model may monolithically stores logical models and metadata from the plurality of different databases.

Moreover, according to such a method, compiling the ontological query may further comprise memoization of the compiled ontological query. Additionally, the method may include a computer comprising a storage device storing a deductive database, and compiling the ontological query may further comprise building join operations that include join operations of the deductive database and join operations of each of the plurality of different databases coupled to the computer. Furthermore, compiling the ontological query may further comprise building join operations between the deductive database and join operations of the plurality of different databases coupled to the computer. In addition, the storage device may store logical models and metadata from the plurality of different databases.

Furthermore, in such a method, the computer may comprise a storage device storing a deductive database, where compiling the ontological query further comprises memoization of the compiled ontological query onto the storage device. The join and combination rules can also comprise translations rules based on the meta-properties of the data from the plurality of different databases, the translation rules translate a datum retrieved from one database of the plurality of different databases to a logical term, and the join and combination rules perform join and combination operations using logical terms translated from the plurality of different databases.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The foregoing and other objects, aspects and advantages described herein will be better understood from the following detailed description with reference to the drawings, in which.

DETAILED DESCRIPTION

Figure 1:
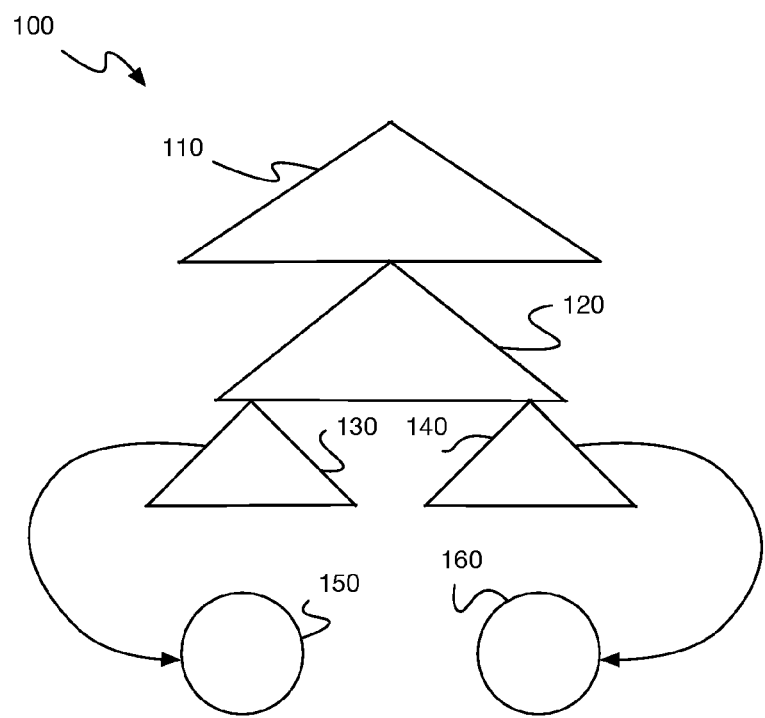
FIG. 1 is a conceptual diagram of the database generation system from the perspective of parent-child ontological relationships, according to an embodiment herein.

In the following detailed description, certain preferred embodiments are described as illustrations of the invention in a specific application, network, or computer environment in order to provide a thorough understanding of the claimed invention. Those methods, procedures, components, or functions which are commonly known to persons of ordinary skill in the field of the invention are not described in detail as not to unnecessarily obscure a concise description of the claimed invention. Certain specific embodiments or examples are given for purposes of illustration only, and it will be recognized by one skilled in the art that the claimed invention may be practiced in other analogous applications or environments and/or with other analogous or equivalent variations of the illustrative embodiments.

Some portions of the detailed description which follows are presented in terms of procedures, steps, logic blocks, processing, and other symbolic representations of operations on data bits within a computer memory. These descriptions and representations are used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result.

It should be borne in mind, however, that all of these and similar terms are to be associated with the appropriate physical quantities and are merely convenient labels applied to these quantities. Unless specifically stated otherwise as apparent from the following discussions, it is appreciated that throughout the claimed invention, discussions utilizing terms such as "processing" or "computing" or "translating" or "calculating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the claimed invention, described below, are discussed in terms of steps executed on a computer system, which may be one of any type having suitable computing resources. Aspects of the claimed invention are also discussed with respect to an Internet system including electronic devices and servers coupled together within the Internet platform, but it may be similarly implemented on any other type of extended network system including wireless data or digital phone networks. Although a variety of different computer systems can be used with the claimed invention, an exemplary computer system is shown and described in the preferred embodiment.

As used herein, an ontology is a formal (concretely specified) description of a business domain. It contains a taxonomy of concepts ("a person is a type of mammal"; "a corporation is a type of legal entity"), and also contains a set of rules relating those concepts to each other ("flight numbers are unique within airlines over time"). Ontologies typically represent these concepts and rules in a completely formal language; their meanings are meant to be accessible to the computer. An ontology is managed by the Ontology Management System (OMS), such as the eXtensible Knowledge Server (XKS) or Remote Knowledge Server (RKS).

According to one embodiment, an OMS ontology has a hierarchy of categories, which denote classes of ontological objects. This hierarchy may be partitioned by the type and attribute hierarchies of the ontology, where the type hierarchy includes the categories that can participate in predicate signatures, and corresponds to symbols that become types within the OMS. The OMS approach to ontological modeling is a Logical Theory: "elements of a Conceptual Model focusing on real world semantics and extended with axioms and rules, also represented in a logical KR language enabling machine semantic interpretation." A Conceptual Model is "concepts structures in a subclass hierarchy, generalized relations, properties, attributes, instances."[p. 31, "Ontological Architectures" by Leo Obrst in *Theory and Applications: Computer Applications of Ontology*, Roberto Poli, Michael Healy, and Achilles Kameas, Editors, 2010: Springer.] The OMS uses a General Logic Programming (GLP) language for its "logical KR language". According to this embodiment, the OMS ontology includes a set of created ontological sentences and associated General Logic Programming (GLP) statements. According to one embodiment herein, First-Order Logic (FOL) with Well-Founded Semantics (WFS) extended with Aggregation Operations and Temporal Logic (Extended First-Order Logic or EFOL) is used to create ontological statements. WFS are natural declarative semantics for general logic programs, and are suitable for embodiments of the claimed invention by allowing for negated sub-goals. Accordingly, embodiments of the claimed invention using EFOL for the ontology makes processing ontological sentences much more concise, conveniently expressive, and efficient compared to conventional ontologies.

For example, a basic EFOL ontological expression is the literal. A positive atomic literal, such as "(pc c ?y)", includes a predicate (p) followed by a series of arguments—where the argument "c" is a constant symbol and "?y" is a variable. Literals can be combined using logical operations such as conjunctions and disjunctions, and can be negated; for example, "(and (p a1) (q ?x) (r ?x)) (or (p a2) (q ?y)) (not (p a3))". In the preceding examples, "and" indicates a conjunction, "or" a disjunction, and "not" a negation. An ontological expression built along the foregoing lines is a Well-Formed Formula (WFF). The General Logic Program implementing an ontology contains General Logic Statements. A General Logic Statement has the form (<=Head Body) where Head is a positive atomic literal and the Body is any WFF. The "<=" symbol indicates an implication; the first argument, "HEAD," is the consequent and the second, "BODY," the antecedent. The BODY is a WFF that can be any combinations of literals and conjunctions, disjunctions, negations, implications ('=>' or '<='), and aggregations thereof, as in the following: "(=>(p ? x) (q ?x)) (=>(and (p ?x) (not (p ?y))) (or (r ?x a1) (r ?y a2)))". In addition, unlike a conventional OMS, embodiments of the claimed invention are designed to be syntactically unambiguous.

The OMS then applies a series of conversion and review steps on the GLP statements of the ontological sentences within the input ontology. For example, the OMS may include a deductive database generator (DDBG) that generates a pre-DDB model (defining the schema of the deductive database), and provides the rules required for reasoning the integrity-constraint checks. According to one embodiment, the deductive database includes a pre-DDB model with a Java server and a backing store.

Additionally, according to one embodiment, the OMS has the concept of an object 'property'. A property is either a 'type' or a 'material role'. As used herein, an object type is a property that holds for an object for all time (i.e., a necessary property versus a contingent one). A material role is a property that holds for an object over some specific time spans (i.e. a contingent property). In so doing, the claimed invention allows for a better correlation between the types in an OMS and the types in the originating ontological specification. In other words, the set of properties associated with objects in relational and object-oriented databases (as well as the programming languages accessing those databases) are usually static (or 'rigid'), meaning that an object does not lose nor gain properties—this is modeled using types. Also, method signatures may consist entirely of these types. Since an OMS according to one embodiment of the claimed invention has a similar notion of type and signatures, there is a much better correlation between the ontological specification and the distributed databases. Additional embodiments of the claimed invention, unlike conventional ontological systems, add a unary predicate for each declared type that is used to check for that type.

In addition, embodiments of the claimed invention differentiate between predicates that are time dependent and those that are not. This distinction permits a programmatic restriction of predicates according to a temporal-model to those predicates that truly depend on it.

Embodiments of the claimed invention handle non-recursive rule sets as well as recursive ones, and thereby make the ontology generation processes reliable and repeatable to decrease the time required to generate a usable database from weeks that is typically associated with conventional ontological systems. The resulting OMS is also more efficient since the entire rule set is optimized with respect to sub-goal reordering. Embodiments of the claimed invention also add integrity constraints to the OMS, where each integrity constraint (IC) may have a set of update dependents. As used herein, according to an IC's update dependents, the IC is checked when an update dependent is updated. Moreover, the dependent bindings permit propagation along a dependency graph when computing these update dependencies and can be used to partially instantiate the IC calls required for an update. An integrity constraint may be defined including concepts derived from distributed databases.

Definitions

To further aide in understanding embodiments of the claimed invention, the following terms are described:

Conjunctive Normal Form (CNF): A normal form for first-order languages that has each expression represented as a conjunction of disjunction. For example: "(and (or (p a1) (q a1)) (r a4))" would be in CNF form.

Cycle, or recursive component, in dependency graph: Each strongly-connected component in the dependency graph for a database forms a cycle, or recursive component. Such a construction indicates that the predicates involved are recursively defined.

Deductive Database (DDB): A database system that represents its model and data using logic expressions and answers queries using logical deduction. The model may use recursion in the definitions of concepts.

Dependency Graph: The rules used to define a predicate induces the dependency graph where the conclusion predicate is dependent on each predicate in the antecedent.

Function: The functors for function terms.

Intensional definition: Includes an intensional Database (IDB), where in a deductive database, the IDB is the set of predicates (or calls) that are defined only by rules and not by direct factual assertions. In an OMS according to the claimed invention, the intensional definition of a predicate includes any query processing in the OMS that requires information from a particular remote data source to be extracted information when needed. In other words, if two successive transactions within the OMS require access to a particular piece of remote information, that information may be extracted twice from the remote source. Significantly, the intensional definition of the queried predicate within the OMS for these two transactions permits the possibly getting different values (e.g., the remote source has changed between transactions).

Extensional definition: Includes an extensional database (EDB), where in a deductive database, the EDB is the set of predicates (or calls) that are defined only by direct factual assertions—they have no rules concluding any of these predicates. In an OMS according to the claimed invention, the extensional definition of a predicate includes the particular predicate in the ontology to be "materialized".

First-order Predicate Calculus (FOPC): Includes first-order logic with classical semantics.

Functor: In a structural term like "(p b)", the "p" is the functor. If the structure is a literal, then the functor would be a predicate; if the structure is a function term, then a function.

Integrity Constraint (IC): An assertion about the state of the OMS that must hold true. If the IC were violated, then the OMS is said to be in an inconsistent state. The denial form is a form of the IC that "denies" the consistency of the OMS so that the success of the denial form indications a violation of the IC.

Memorization: An optimization technique used to improve efficiency by avoiding the repeated calculation of results for previously processed inputs, and also to hold partial results for parallel evaluation of predicates in a recursive dependency cycle. As discussed in further detail below, an OMS according to embodiments of the claimed invention permits a predicate in the ontology to be materialized. For example, a materialize predicate is stored in the OMS as a "virtual table" such that the OMS extracts information from a number of remote data sources to determine the values that belong in the predicate's "virtual table". Once the predicate is materialized, then the inferential definition of that predicate (e.g., as available in the "virtual table") is disabled and only the extensional data (the materialization) is used to answer queries involving that predicate.

General-purpose ontology: Used here to refer to large, FOPC-based ontologies oriented towards giving a declarative specification of common-sense knowledge, and extending that description into specific domains.

Predicate: The functors for literals. Also referred to as 'relation'.

Population Rule: These rules are used to conclude membership in a type, but do not include the usual rules used to implement the type hierarchy. For example, if T2 is a sub-type of T1 (so that each T2 is also a T1), then the rule "(=>(T2 ?X) (T1 ?X))" would not be considered a population rule, but "(=>(and (p ?x ?y) (q ?x)) (T2 ?X))" would be.

Rectification: A rectification version of a rule is such that the conclusion has only variables as arguments.

Strongly-connected Component (SCC): A set of nodes in a graph form a strongly-connected component (SCC) if each node in the set can reach each other node in the set.

Sub-goal: A sub-goal is an antecedent in a rule, also referred to as a sub-query (the conclusion being the primary query).

Type-checking predicate: A predicate (or call) used to check that a target symbol has a declared target type. For example, "(inst b person)" checks if "b" has type person, or is "an instance of person".

Ontological data model: An ontological data model is a description of a real-world problem domain (a "model") using a lattice of properties and relations on the entities that instantiate those properties, all expressed in first-order logic extended with temporal reasoning.

Logical model(s): A logical model is a collection of extended first-order logic statements that is internally consistent and that has a consistent interpretation.

Ontological query: An Ontological query is a query of a database with an ontological data model where the query is proved constructively from the database: The query is a logical formula that is implicitly existential over any free variables and the constructive proof finds bindings of those free variables for which the query can be shown to be logically inferred from the database.

Meta-properties: A meta-property is a property of properties or relations. In the logical model of a data model, for example, the per-table Key property is an instance of the Type meta-property.

Logical term: A logical term is an entity in an extended first-order logical language that is a basic term such as a number or a quoted string or a named symbol or a variable or a compound term with a named symbol or variable as the 'functor' and zero or more arguments, each of which is a logical term.

A ground logical term is a logical term that does not contain any variable terms.

Meta-relationships: A meta-relationship is a relationship among entities of a model, for instance, the 'sup' relation (short for super-property) relates two Property entities.

DETAILED DESCRIPTION OF PREFERRED EMBODIMENTS

Referring now to the drawings, and more particularly to FIG. 1, there is shown a high level conceptual diagram parent-child ontological relationships of data stored in data sources external to OMS 100. For example, these data sources include, but are not limited to, relational databases (such as a relational database management system, or RDBMS), spreadsheets, tabular data in text files (e.g. Comma-Separated Values), and other ontologies. In FIG. 1, triangles 110-140 represent ontologies residing within OMS 100. For instance, the ontology that represents the world, or background information, is represented as the parent ontology 110. Often, world ontology 110 is spread across a wide variety of data sources. According to embodiments of the claimed invention, however, world ontology 110 is a single ontology within OMS 100 that seamlessly accesses multiple remote data sources, integrating the remote information with the full semantic and logical capabilities of OMS 100. Specialized ontologies, for metabolic pathways 130 and genomics 140, are also shown in OMS 100, where both of these ontologies are children of the biochemistry ontology 120, which is also a child of the world ontology 110. As a non-limiting example, the metabolic pathways 130 and genomics 140 ontologies each draw from a separate data source (i.e., data source 150 and data source 160, respectively).

According to the example shown in FIG. 1, therefore, the metabolic pathways 130 and genomics 140 ontologies contribute to the biochemistry ontology 120 such that biochemistry ontology 120 includes two separate data sources (i.e., data source 150 and data source 160). By defining a hierarchy of ontologies, embodiments of the claimed invention permits OMS 100 to provide ontology-driven access to a wide variety of data sources external to OMS 100 using a common method, with common parent ontologies. Moreover, the elements of the parent ontologies are automatically generated and repeatable, by virtue of ancestral relationships.

According to one embodiment of the claimed invention, an ontology in OMS 100 (e.g., any one of ontologies 110-140) is generated in accordance with the high level flow diagram as illustrated in FIG. 1.

Additionally, according to one embodiment of the claimed invention, OMS 100 includes two operating modes: operating as an ontological data federation tool and operating as an ontological data warehouse. These operating modes of OMS 100 are not mutually exclusive and OMS 100 may operate both modes simultaneously (e.g., world ontology 110 operates in ontological data federation mode and biochemistry ontology 120 operates in ontological data warehouse mode).

For example, according to one embodiment herein, ontological data warehouse mode of OMS 100 is invoked by requesting that a particular predicate (relation) in the ontology be "materialized". When receiving this request, OMS 100 stores a "virtual table" in a persistence store associated with OMS 100 for that predicate, thereby extracting all the required information from any number of remote data sources to determine the values that belong in the predicate's virtual table. Once the predicate is materialized, then the inferential definition of that predicate (the "virtual" definition) is disabled and only the extensional data (the materialization) is used to answer queries involving that predicate.

Further embodiments of OMS 100 enter ontological data warehouse mode by memorizing previously computed answers to queries and sub-queries (sub-goals). Additionally, analysis of the rule set by the embodiments of the claimed invention will memorize at least one call for each loop in the predicate dependency graph. By performing this analysis, OMS 100 prevent infinite loops of the sub-goal from occurring during query evaluation. For example, according to one embodiment, this analysis is accomplished by repeatedly searching for a loop in the dependency graph. Each time a loop is detected, a predicate is automatically chosen for memorizing and removed from the graph.

The ontology utilized by OMS 100 includes of a set of ECLIF sentences (where ECLIF is a form of GLP, where the set forms an ECLIF model of the ontology), each of which has an associated conjunctive normal form (CNF) version. The CNF version is the Normal Logic Programming (NLP) form of the GLP ECLIF sentences. In a Normal Logic Program the statements (or equivalently "sentences") have the clause form of a clause consisting of a positive atomic literal as the 'head' of the clause and a conjunction of positive and negative atomic literals. In the OMS this basic idea of a Normal Logic Program Statement is extended with additional literal types: holdsIn literals for temporal logic and aggregation literals (e.g. (sum ?v (P ?x ?v) ?s) where ?s is the sum of all distinct bindings of pairs of ?x and ?v by (P ?x ?v)). According to one embodiment herein, a database generator applies a series of conversion and review steps on the NLP CNF of the ECLIF sentences within the input ontology and generates a deductive database artifact that defines the schema of the database, as well as provides the rules required for reasoning and integrity-constraint checks. According to the preferred embodiment herein, the persistence store of the ontologies of OMS 100 (e.g., ontologies 110-140) is in a deductive database embodied by an eXtensible Knowledge Server (XKS).

In addition, according to certain embodiments of OMS 100 described herein include a temporal model in the ontology. For example, according to one such embodiment, the temporal model is implemented by modifying the rule and literal (described in further detail below) that must reason over time. Moreover, not all literals have temporal bounds—those that do not are not modified, and those that do are given a start-time and an end-time argument.

Figure 2:
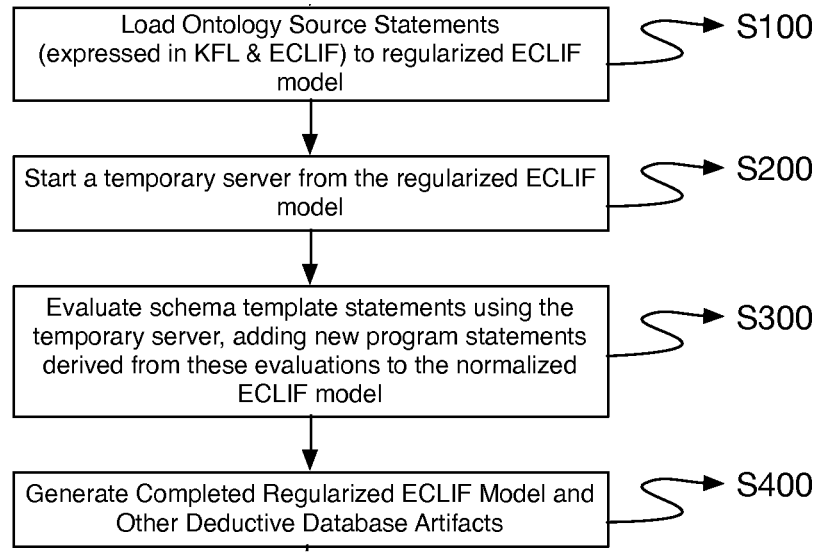
FIG. 2 is a flow diagram illustrating an OMS follows to generate a deductive database artifact, according to an embodiment herein.

FIG. 2, with reference to FIG. 1, is flow diagram an OMS (e.g., OMS 100) follows to generate a deductive database artifact; where the method shown in FIG. 2 commences by loading a target General Logic Programming (GLP) statements in step S100. The method of FIG. 2 then starts a temporary server from the regularized ECLIF model (in S200) to evaluate schema template statements and add new program statements derived from these evaluations to the normalized ECLIF model (in S300). Finally, in step S400, the method of FIG. 2 generates a completed regularized ECLIF Model and other deductive database artifacts.

Figure 3:
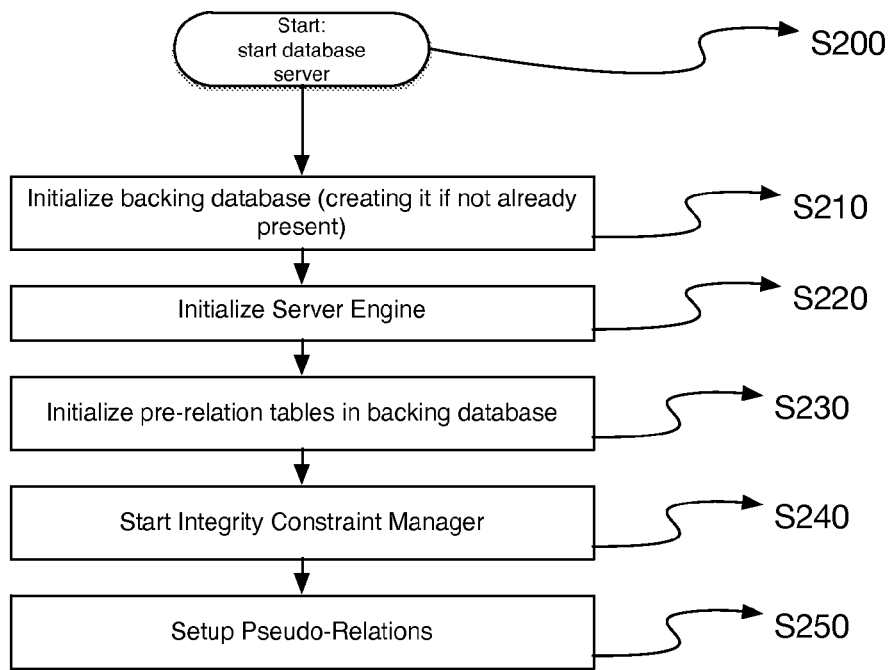
FIG. 3 is a flow diagram illustrating a method of starting an OMS database server, according to an embodiment herein.

Referring now to FIG. 3, with reference to FIGS. 1 and 2, is a flow diagram that illustrates starting a database server according to an embodiment herein. Significant processing and maintenance of the ontology utilized by OMS 100 occurs during S200. In the preferred embodiment herein, the temporary server is an XKS server by HIGHFLEET Inc. and in initializee in step S220. The processing of the regularized ECLIF to prepare for evaluating queries is done in step S220.

Figure 4:
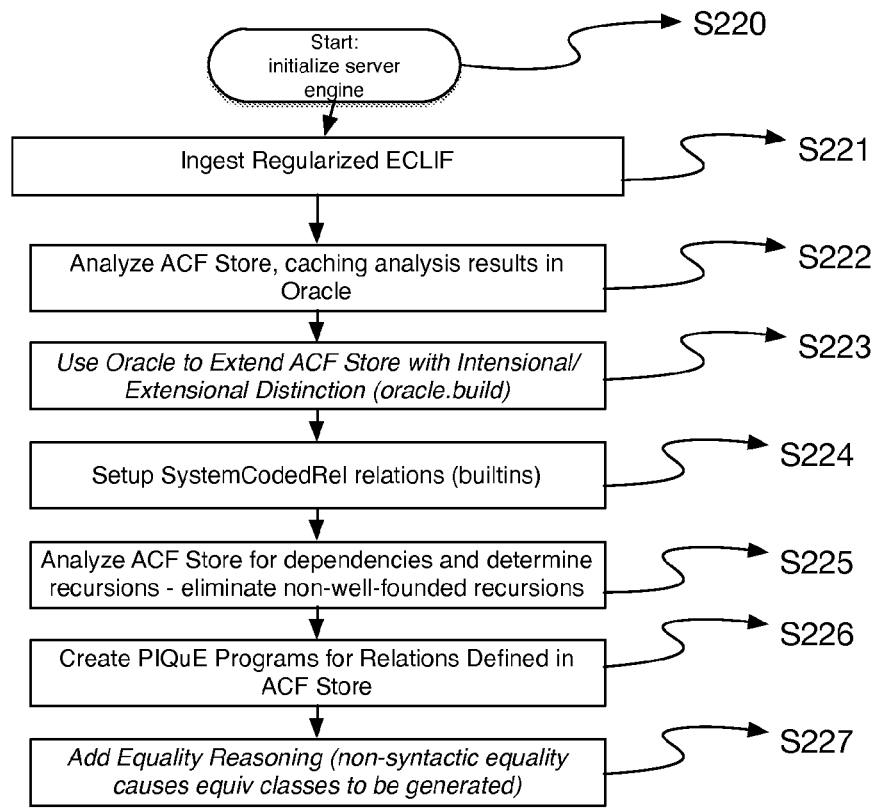
FIG. 4 is a flow diagram illustrating a method of initiating an OMS server engine, according to an embodiment herein.

FIG. 4, with reference to FIGS. 1 through 3, shows a flow diagram of initializing a server engine, according to one embodiment herein. In FIG. 4, the conversion of the regularized ECLIF to an Abstract Clause Form (ACF) is done in S221. In step S221, as discussed below, various forms of formulas (as discussed above) used in the 'body' (or "antecedent") of an ECLIF clause are transformed to logically equivalent formulation and thereby creating several ECLIF clauses from a single input clause. Step 222 analyzes the ACF Store and caches the analysis results (for example, in an oracle). In step S223, a distinction is made between Intensional Definition (ID) and Extensional Definition (ED) in the cache of analysis results. Step S224 sets up System-CodedRel relations (built into the persistence store; e.g., an XKS server) and step S225 further analyzes the ACF Store for dependencies and recursions. Step S225 also eliminates non-founded recursions during its analysis. As discussed further, with respect to FIG. ^, the processed ACF is then optimized and compiled to create an executable program in S226. Finally, equality reasoning is added in step S227.

Figure 5:
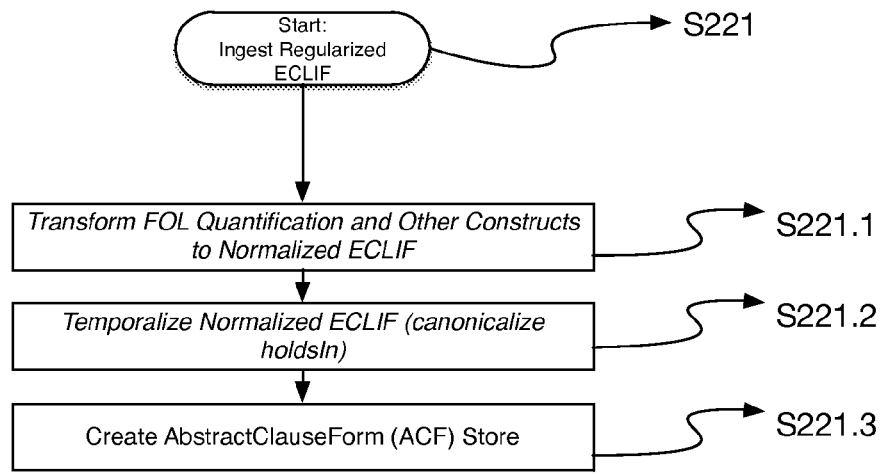
FIG. 5 is a flow diagram illustrating a method of conversion from regularized ECLIF to ACF, according to an embodiment herein.

FIG. 5, with reference to FIGS. 1 through 4, shows a flow diagram of the conversion of regularized ECLIF to ACF, according to one embodiment herein. In FIG. 5, step S221.1 includes existential quantification conversion. According to one embodiment herein, the transformation encompasses the Lloyd-Topor transformations for existential quantification ('exists'), universal quantification ('forall'), negation, and implication in step S221.1. This conversion implements explicit existential quantification using the implicit existential quantification of the variables free in the 'body' (or consequent) of a logic program statement that are not referenced in the 'head' (or antecedent) of that statement. Such a statement, for example, may include a formula F of the form F=(and A[?y1 . . . ?yK] E[? y1 . . . ?yK]) where existential sub-formula E=(exists (?x1 . . . ? xN) P[?x1 . . . ?xN ?y1 . . . ?yK]) where P is some well-formed formula free in variables ?x1 . . . ?xN ?y1 . . . ?yK. The formulas A and E are free in variables ?y1 . . . ?yK. The conversion process creates a new relation ont_auxM (where M is an integer chosen to ensure uniqueness) and creates a new statement "(<=(ont_auxM ?y1 . . . ?yK) P[?x1 . . . ?xN ?y1 . . . ?yK])". The ?xi are free in the body of this General Logic Programming statement and are not referenced in the head of that statement and thus they are (implicitly) existentially quantified. The formula F is modified to use this new relation, F'=(and A[?y1 . . . ?yK] (ont_auxM ?y1 . . . ?yK)).

The result of these transformations is a Normalized ECLIF form of clauses. The Normalized ECLIF rules are temporalized in step S221.2. The Normalized ECLIF statements are converted to rules (the form of these rules is named Abstract Clause Form (ACF) in the preferred embodiment) in step S221.3. As described above, to certain embodiments of OMS 100 include a temporal model. According to one embodiment, when OMS 100 include a temporal model, step S221.2 prepares for temporal conversion of a statement and step S221.3 includes temporal conversion as part of creating the ACF representation of the Normalized ECLIF.

Figure 6:
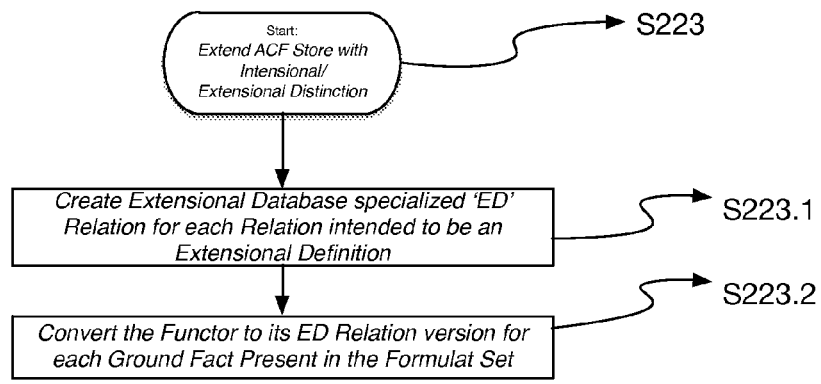
FIG. 6 is a flow diagram illustrating a method of extending an ACF Store with intensional/extensional distinctions, according to an embodiment herein.

FIG. 6, with reference to FIGS. 1 through 5, shows a flow diagram of extending the ACF Store with intensional/extensional distinctions, according to one embodiment herein. In step S223, rules accommodating intensional definitions (e.g., an EDB-store version) and extensional definitions (e.g., an EDB-call rule) are added for each predicate intended to be dynamic base relations in OMS 100. For each ground fact on dynamic base-relation predicate present in the formula set, the functor is converted to its extensional definition (e.g., EDB-store version), in step S223.1. Each "edbForm" literal appearing as an antecedent is then converted to its extensional definition (e.g., an EDB-call literal), in step S223.2.

Figure 7:
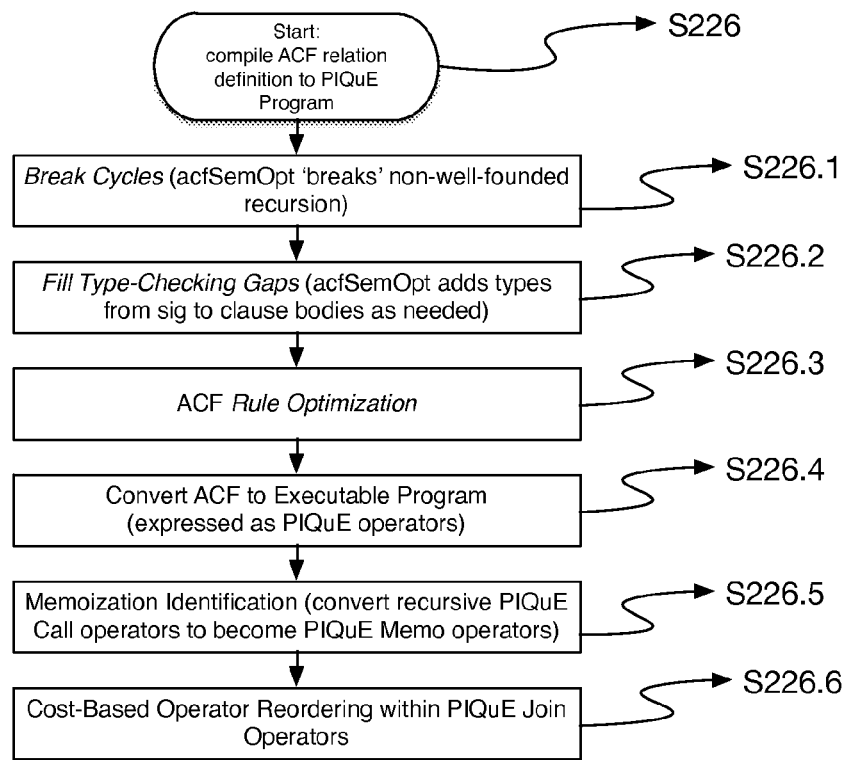
FIG. 7 is a flow diagram illustrating a method of compiling an ACF relation definition to a deductive database program executable by an OMS, according to an embodiment herein.

FIG. 7, with reference to FIGS. 1 through 6, shows a flow diagram of compiling an ACF relation definition to a deductive database program executable by OMS 100 (e.g., a PIQuE program), according to one embodiment herein. In other words, FIG. 7 is a flow diagram illustrating the process of compiling an ACF relation definition to an Executable Program (a network of operators in the PIQuE system). In step S226.1, cycles are broken in step S226.1 and type-checking gaps are filled in step S226.2. For example, the ACF Semantic Optimization process in step S226.1 applies Well-Founded Semantics to 'break' recursion that is not well-founded, creating non-recursive rules. Step S226.2 processes property constraints implied by the signature of the relation being compiled to add new literals to the body of each clause for the relation.

The ACF rules are then optimized in step S226.3. Several optimizations are applied in step S226.3, including (but not limited to) expanding literals in place, removing clauses that are false a priori due to disjoint properties being applied to the same term, and reducing transitive equality references. The optimized ACF rules are converted in step S226.4 to the deductive database program, a collection of PIQuE plan objects in the preferred embodiment. A query of the deductive database system is evaluated by executing these PIQuE plan objects. Memorization identification is performed in step S226.5. Memorization is applied to handle recursive rule definitions in step S226.5. According to the preferred embodiment, these rules are evaluated using an asynchronous parallel processing model and are therefore neither 'left' nor 'right' recursive. As discussed previously, step S225 of FIG. 4 analyzes the ACF store for recursions. This information is used in step S226.5 to select Call operations to be converted to Memo operations: these Memo operations cooperate to handle and properly terminate recursive evaluations. The Call operations that are selected for Memoization are those operations that evaluate literals for Relations that have been found to be recursive by step S225. At least one Call operation in each strongly connected component (by dependency analysis) is converted to a Memo operation.

The 'join' plan objects (which sequence the evaluation of other plan objects) are optimized in step S226.6. For example, according to the embodiment shown in step S226.6 of FIG. 7, sub-operations of a join operation are ordered according to a cost model. By reordering sub-operations, embodiments herein minimize the overall cost of the join according to the cost model.

As discussed previously, the preferred embodiment of the claimed invention is a Remote Knowledge Server (RKS) that is as an extension of the XKS Deductive Database System. FIGS. 8 through 12, with reference to FIGS. 1 through 7 describes the XKS component architecture and the RKS extensions to the XKS architecture.

Figure 8:
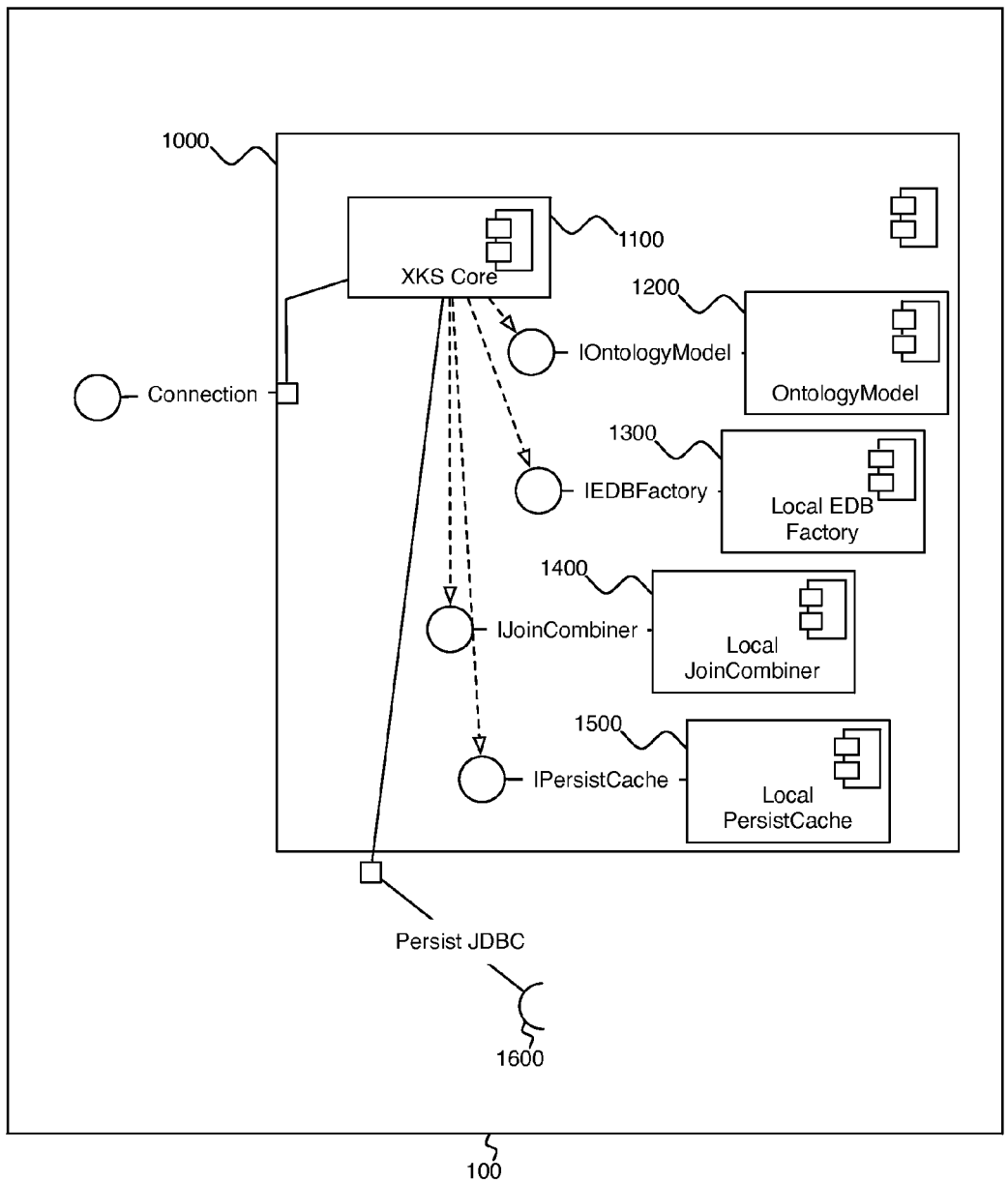
FIG. 8 is a schematic diagram illustrating the components of an XKS system, according to an embodiment herein.

Referring now to FIG. 8, the component embodiment of a local XKS 1000 (i.e., an XKS that only has local data; that is not an RKS) is shown. This component has a primary sub-component, the XKS Core 1100. There are four of the interfaces of XKS Core 1100 that are implemented by the local XKS component: OntologyModel 1200 component implements IOntologyModel, LocalEDBFactory 1300 implements IEDBFactory, LocalJoinCombiner 1400 implements IJoinCombiner, and LocalPersistCache 1500 implements IPersistCache. There is one unimplemented interface, Persist JDBC 1600. According to one embodiment, Persist JDBC 1600 is implemented by the backend database server specified for a particular XKS deployment. Below is a more detailed description of the different components of local XKS 1000.

OntologyModel 1200 component: The XKS ontology model is the General Logic Program defining an ontology of Properties of terms and Relationships between two or more terms, including 'sup' and 'supRel' for "super class" relationship between property terms and relationship terms, respectively, and 'inst' for "instance of property/type" relationship between terms and property terms. The LocalEDBFactory 1300 component: The 'local' Extensional Database (EDB) factory maps an EDB-referring ACF literal with relation term R to a LocalEDBOperator object that accesses the local data store of ground atomic facts for relation R. The LocalJoinCombiner 1400 component: The 'local' joinCombiner combines adjacent local EDB operators in a general join operator sequence to create a 'local EDB join' operator that implements the join by using the local data store's join capabilities. (e.g. SQL SELECT statement JOIN) The LocalPersistCache 1500 component: The 'local' persistCache creates a persistent cache of the ground atomic facts that are the extension of a specified intensional relationship R (i.e. R is defined intensionally in the 'ontologyModel'). After caching, the ACF compiler compiles an ACF literal on R using the local EDB factory.

Figure 9:
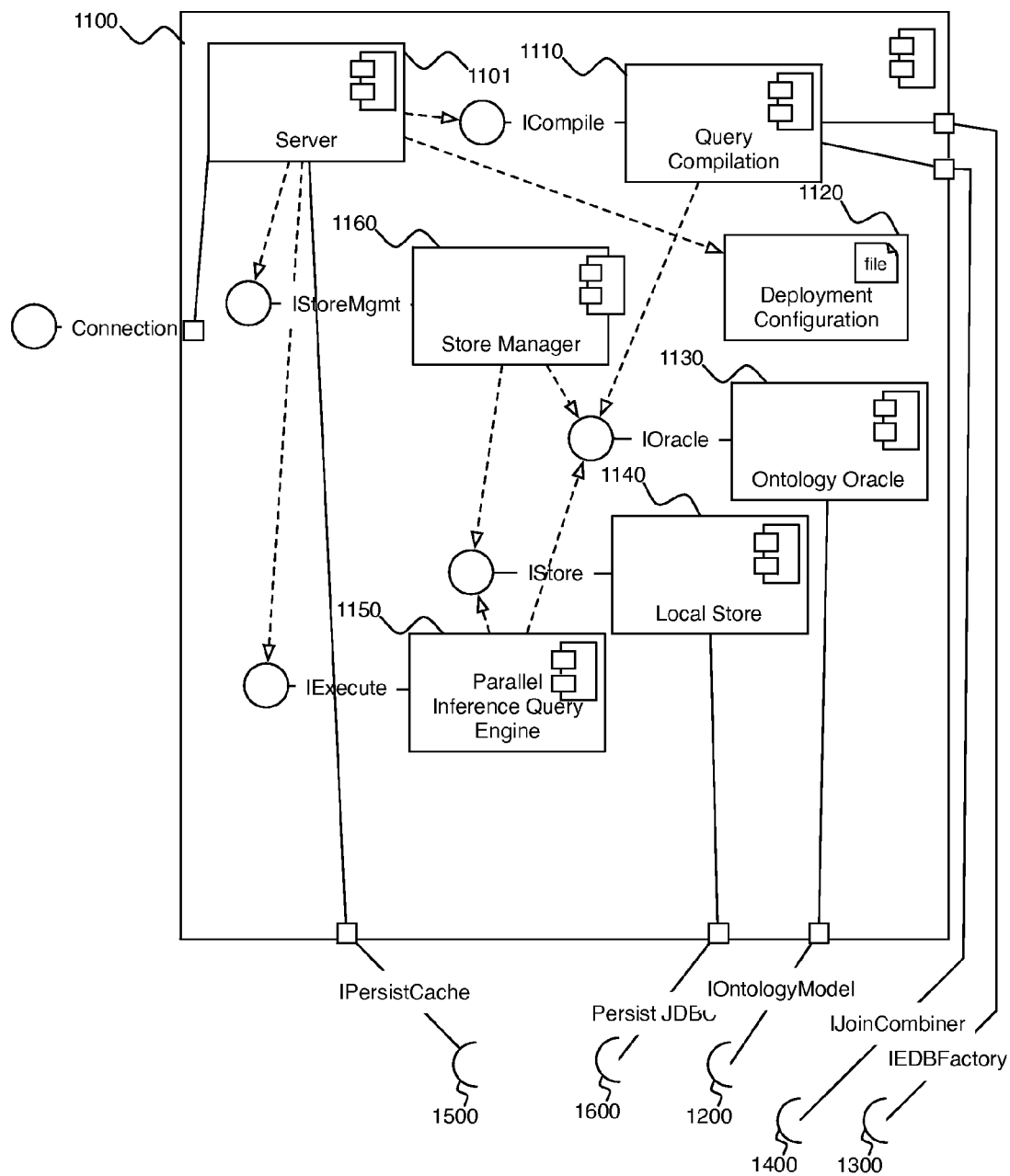
FIG. 9 is a schematic diagram illustrating the components of an XKS core, according to an embodiment herein.

Referring now to FIG. 9, the component architecture of a preferred embodiment of a local XKS Core 1100 is shown. There are five interfaces on which the XKS Core component depends: IPersistCache 1500, PersistJDBC 1600, IOntologyModel 1200, IJoinCombiner 1400, and IEDBFactory 1300. Each of these interfaces is used by a sub-component of XKS Core: Server 1101 depends on IPersistCache 1500, LocalStore 1140 depends on PersistJDBC 1600, OntologyOracle 1130 depends on IOntologyMode 1200, and QueryCompilation 1110 depends on IJoinCombiner 1400 and IEDBFactory 1300. In addition, Store Manager 1160 manages Local Store 1140 and Ontology Oracle 1130. Moreover, Parallel Interface Query Engine 1150 is initiated by Server 1101 and communicates with Local Store 1140 and Ontology Oracle 1130.

Figure 10:
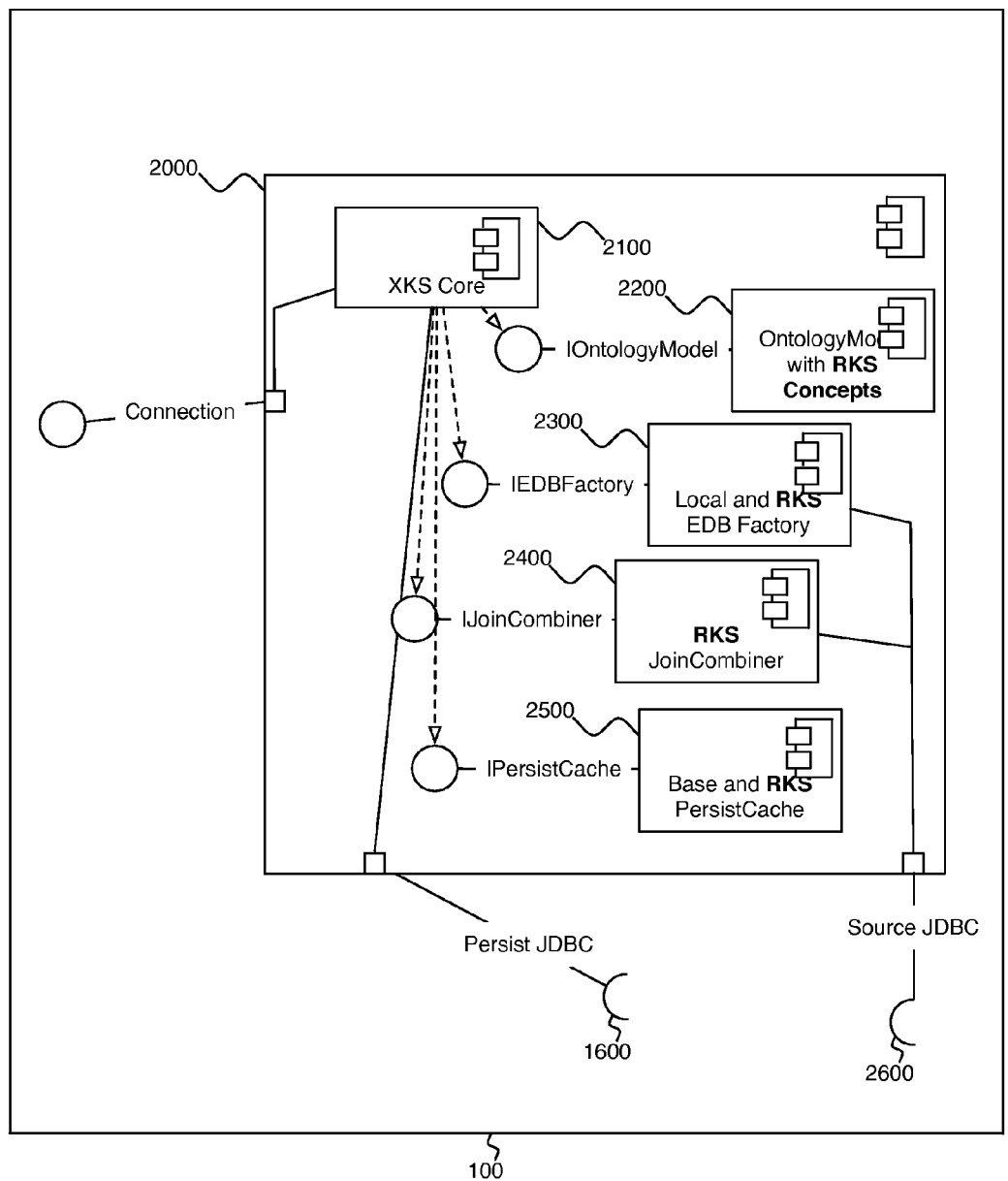
FIG. 10 is a schematic diagram illustrating the components of an XKS-RKS system, according to an embodiment herein.

According to the preferred embodiment, remote access aspects of the flow diagrams of FIGS. 1 through 7 are included in RKS-XKS 2000 of FIG. 10, where RKS-XKS 2000 includes an extension of XKS Core 1100 (i.e., XKS Core 2100) by way of the four sub-components for IOntologyModel 1200, IEDBFactory 1300, IJoinCombiner 1400, and IPersisCache 1500 interfaces.

Referring now to FIG. 10, the component embodiment of an RKS-XKS 2000 (i.e., an XKS that is an RKS) is shown. RKS-XKS 2000 includes XKS Core 2100, which according to one embodiment is similar to XKS Core 1100 but has been specifically adapted to communicate with remote data sources. There are four of the interfaces of XKS Core 2100 that are implemented by RKS-XKS 2000: OntologyModelWithRKSConcepts 2200 component implements IOntologyModel, LocalAndRKSEDBFactory 2300 implements IEDBFactory, LocalAndRKSJoinCombiner 2400 implements IJoinCombiner, and LocalAndRKSPersistCache 2500 implements IPersistCache. There are two unimplemented interfaces: Persist JDBC 1600 and Source JDBC 2600. This is implemented by the backend database server specified for a particular instance of RKS-XKS 2000. Below is a more detailed description of the different components of XKS-RKS 2000.

The OntologyModel with RKS Concepts 2200 component: The XKS ontology model with RKS concepts is a 'local' ontology model plus standard RKS meta-properties and meta-relationships that are used to define specific RKS ontology terms describing one or more remote data sources, mapping the structure and contents of a remote data source to the uses of the XKS. The Local and RKS EDB Factory 2300 component: The 'local' and RKS Extensional Database (EDB) factory maps an EDB-referring ACF literal with relation term R to an EDBOperator object that accesses the data store of ground atomic facts for relation R. If R is names a relationship mapped to a remote data source, then an RKSEDBOperator is created, otherwise a LocalEDBOperator is created. The Local and RKS JoinCombiner 2400 component: The 'local' and RKS joinCombiner combines adjacent compatible EDB operators in a general join operator sequence to create a 'combined EDB join' operator that implements the join by using the serving data store's join capabilities. Among other restrictions, compatible operators use the same data source. If the common data source is the local store, then the joinCombiner create a LocalJoinOperator, otherwise it creates an RKSJoinOperator. The Local and RKS PersistCache 2500 component: The persistCache creates a persistent cache of the ground atomic facts that are the extension of a specified relationship R. If R is defined intensionally in the 'ontologyModel' then this create a 'local' cache (a "materialization"). If R is mapped to a remote data source, then this copies the remote data to the local store (an "ingest"). In either event, after caching the ACF compiler compiles an ACF literal on R using the local EDB factory.

Figure 11A:
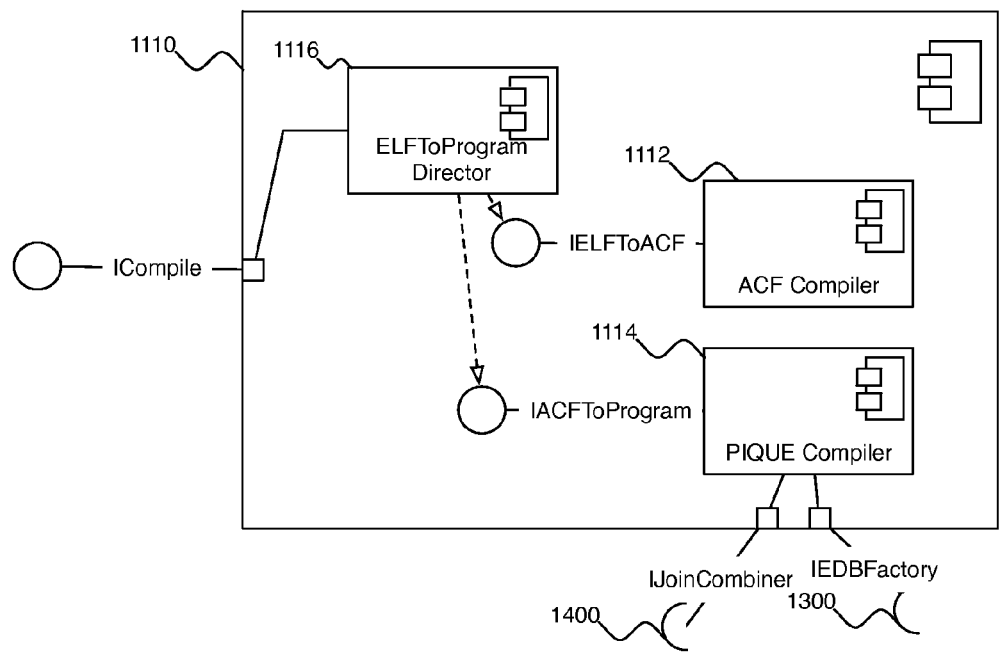
FIG. 11A is a schematic diagram illustrating the sub-components of a query compilation component to either an XKS system or an XKS-RKS system, according to an embodiment herein.
Figure 11B:
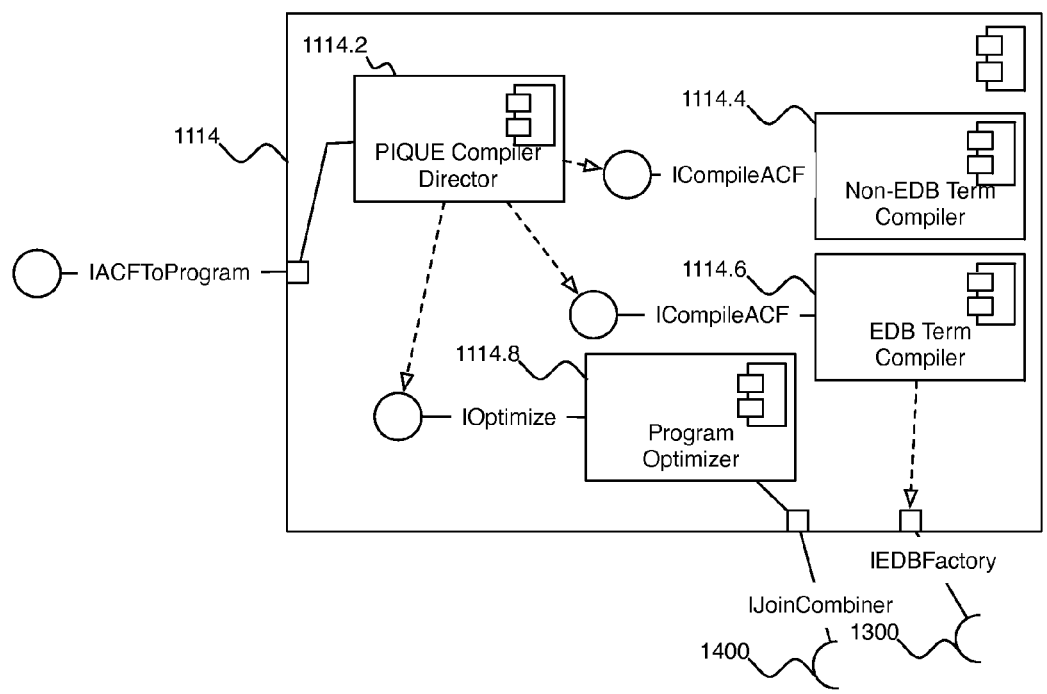
FIG. 11B is a schematic diagram illustrating the sub-components of a PIQuE compiler component to either an XKS system or an XKS-RKS system, according to an embodiment herein.

Referring now to FIG. 11A, the Query Compilation 1110 component is a sub-component of the XKS Core 1100 and XKS-RKS 2100 components of FIGS. 9 and 10. In the Query Compilation 1110 component there is an ELFToProgram Director 1116 and two sub-components, ACFCompiler 1112 and PIQuE Compiler 1114. As further illustrate in FIG. 11B, PIQuECompiler 1114 sub-component contains a PIQuE Compiler Director 1114.2 and three sub-components: Non-EDBTermCompiler 1114.4, EDBTermCompiler 1114.6, and ProgramOptimizer 1114.8. PIQuECompiler 1114 depends on two interfaces, IJoinCombiner 1400 and IEDBFactory 1300, where EDBTermCompiler 1114.6 depends on IEDBFactory and ProgramOptimizer 1114.8 depends on IJoinCombiner.

Figure 12:
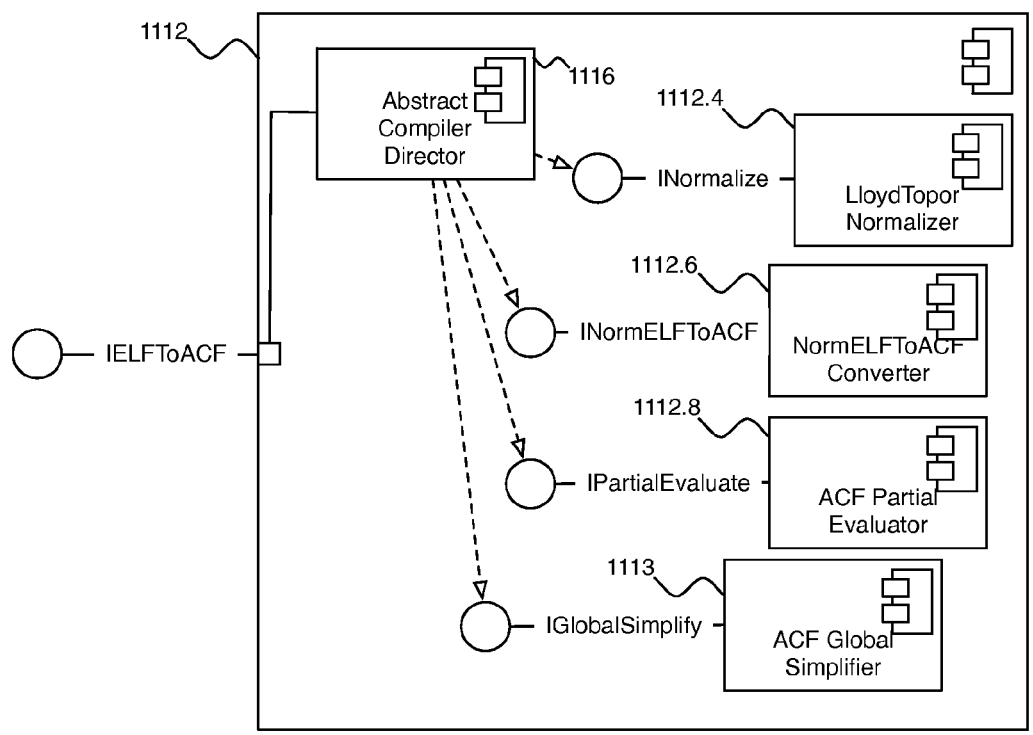
FIG. 12 is a schematic diagram illustrating the sub-components of an ACFCompiler component to either an XKS system or an XKS-RKS system, according to an embodiment herein.

Referring now to FIG. 12, ACFCompiler ACFCompiler 1112 component does not depend on any external interfaces. It has five sub-components: AbstractCompilerDirector 1112.2, LloydToporNormalizer 1112.4, NormELFToACFConverter 1112.6, ACFPartialEvaluator 1112.8, and ACFGlobalSimplifier 1113.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 13:
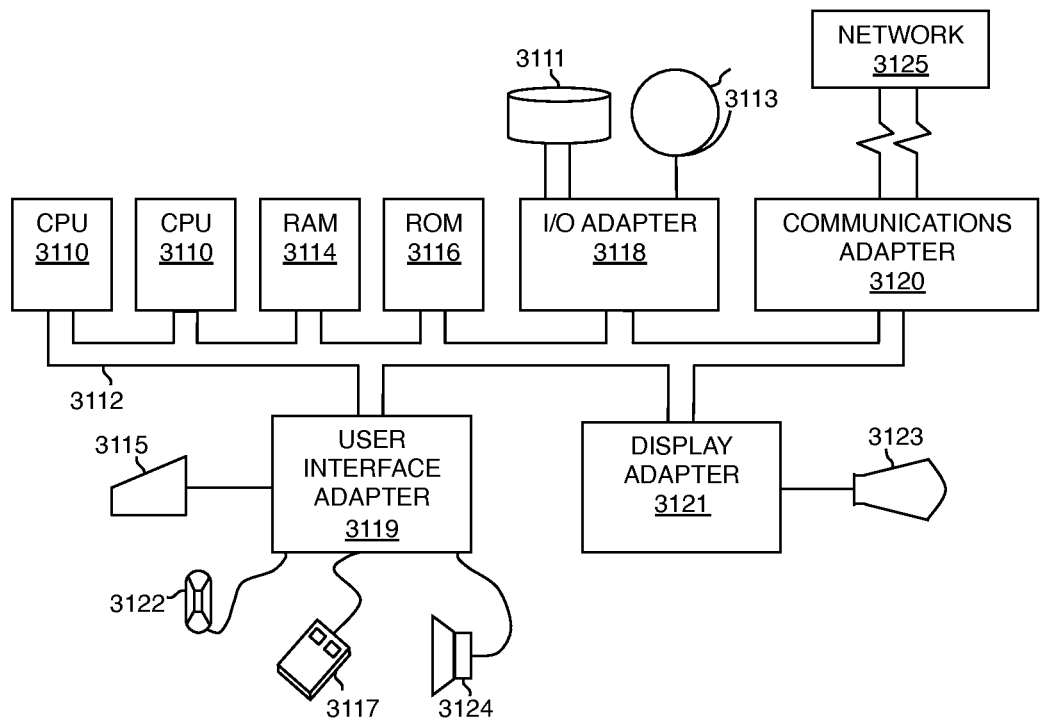
FIG. 13 is illustrates a schematic diagram of a computer architecture used in accordance with the embodiments herein.

A representative hardware environment for practicing the embodiments herein is depicted in FIG. 13. This schematic drawing illustrates a hardware configuration of an information handling/computer system in accordance with the embodiments herein. The system comprises at least one processor or central processing unit (CPU) 3110. The CPUs 3110 are interconnected via system bus 3112 to various devices such as a random access memory (RAM) 3114, read-only memory (ROM) 3116, and an input/output (I/O) adapter 3118. The I/O adapter 3118 can connect to peripheral devices, such as disk units 3111 and tape drives 3113, or other program storage devices that are readable by the system. The system can read the inventive instructions on the program storage devices and follow these instructions to execute the methodology of the embodiments herein. The system further includes a user interface adapter 3119 that connects a keyboard 3115, mouse 3117, speaker 3124, microphone 3122, and/or other user interface devices such as a touch screen device (not shown) to the bus 3112 to gather user input. Additionally, a communication adapter 3120 connects the bus 3112 to a data processing network 3125, and a display adapter 3121 connects the bus 3112 to a display device 3123 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for processing an ontological query for data from any of a plurality of different databases on a network coupled to a computer, comprising:
    loading a ontological data model that comprises a plurality of logical models based on data from the plurality of different databases;
    compiling the ontological query and optimizing the compiled ontological query according to join and combination rules based on the logical models and describing meta-properties of the data and meta-relationships based on the meta-properties between the data from the plurality of different databases; and
    processing logical operations on the compiled ontological query,
    wherein the data from the plurality of different databases defines a hierarchy of ontologies in parent-child relationship,
    wherein the hierarchy of ontologies includes:
    a first child ontology accessing data from a first of the plurality of different databases;
    a second child ontology accessing data from a second of the plurality of different databases;
    and a parent ontology;
    wherein the first and second child ontologies contribute to the parent ontology such that the parent ontology accesses data from both the first and second databases.

2. The method of claim 1, wherein the logical operations include existential qualifications, aggregations and negation.

3. The method of claim 1, wherein the ontological model substantially describes each of the plurality of different databases.

4. The method of claim 1, wherein the ontological model monolithically stores logical models and metadata from the plurality of different databases.

5. The method of claim 1, wherein compiling the ontological query further comprises memoization of the compiled ontological query.

6. The method of claim 1, wherein:
    the computer comprises a storage device storing a deductive database, and
    compiling the ontologicial query further comprises building join operations that include join operations of the deductive database and join operations of each of the plurality of different databases coupled to the computer.

7. The method of claim 6, wherein compiling the ontologicial query further comprises building join operations between the deductive database and join operations of the plurality of different databases coupled to the computer.

8. The method of claim 6, wherein the storage device stores logical models and metadata from the plurality of different databases.

9. The method of claim 1, wherein:
    the computer comprises a storage device storing a deductive database, and
    compiling the ontological query further comprises memoization of the compiled ontological query onto the storage device.

10. The method of claim 1, wherein:
    the join and combination rules comprise translations rules based on the meta-properties of the data from the plurality of different databases,
    the translation rules translate a datum retrieved from one database of the plurality of different databases to a logical term, and
    the join and combination rules perform join and combination operations using logical terms translated from the plurality of different databases.

11. The method of claim 1, wherein the first and second databases are different databases.

12. The method of claim 1, wherein the hierarchy of ontologies is managed by an ontology management system (OMS).

13. A method for processing an ontological query for data from any of a plurality of different databases on a network coupled to a computer, comprising:
    loading a ontological data model that comprises a plurality of logical models based on data from the plurality of different databases;
    compiling the ontological query and optimizing the compiled ontological query according to join and combination rules based on the logical models and describing meta-properties of the data and meta-relationships based on the meta-properties between the data from the plurality of different databases; and
    processing logical operations on the compiled ontological query,
    wherein the data from the plurality of different databases defines a hierarchy of ontologies in parent-child relationship, wherein the ontology management system comprises:
    an ontological data federation operating mode; and
    an ontological data warehouse operating mode.

14. The method of claim 13, wherein the ontology management system can operate in the ontological data federation operating mode and the ontological data warehouse operating mode simultaneously.

15. The method of claim 13, wherein the ontological data warehouse operating mode is invoked by a request that a particular predicate in the ontology be materialized.

16. The method of claim 13, wherein the ontological data warehouse operating mode is invoked by memoizing previously computed answers to queries and sub-queries.

* * * * *